United States Patent
Uchiyama et al.

(10) Patent No.: US 9,784,200 B2
(45) Date of Patent: Oct. 10, 2017

(54) EXHAUST PURIFICATION SYSTEM

(71) Applicant: ISUZU MOTORS LIMITED, Tokyo (JP)

(72) Inventors: Tadashi Uchiyama, Kamakura (JP); Hidekazu Fujie, Yamato (JP); Naoto Murasawa, Yamato (JP); Satoshi Hanawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/027,034

(22) PCT Filed: Oct. 8, 2014

(86) PCT No.: PCT/JP2014/076962
§ 371 (c)(1),
(2) Date: Apr. 4, 2016

(87) PCT Pub. No.: WO2015/053323
PCT Pub. Date: Apr. 16, 2015

(65) Prior Publication Data
US 2016/0237930 A1    Aug. 18, 2016

(30) Foreign Application Priority Data
Oct. 8, 2013   (JP) .................. 2013-210700

(51) Int. Cl.
*F01N 3/00* (2006.01)
*F02D 41/02* (2006.01)
(Continued)

(52) U.S. Cl.
CPC ......... *F02D 41/029* (2013.01); *F01N 3/0253* (2013.01); *F01N 3/106* (2013.01);
(Continued)

(58) Field of Classification Search
CPC ........ F01N 3/106; F01N 9/002; F01N 3/0253; F01N 13/0097; F02D 41/029
(Continued)

(56) References Cited

U.S. PATENT DOCUMENTS

2008/0155968 A1* 7/2008 Salemme ................ F01N 3/035
60/288

FOREIGN PATENT DOCUMENTS

EP         2 390 480 A1    11/2011
JP         2008-8151       1/2008
(Continued)

OTHER PUBLICATIONS

Espacenet Bibliographic data, Publication No. 2010-144630, published Jul. 1, 2010.
(Continued)

*Primary Examiner* — Jason Shanske
(74) *Attorney, Agent, or Firm* — Staas & Halsey LLP

(57) ABSTRACT

An exhaust purification system includes: a diesel oxidation catalyst (DOC) provided on an exhaust passage of an engine; a diesel particulate filter (DPF) provided on the exhaust passage at a position downstream of the DOC to collect particulate matter contained in exhaust gas; electrodes that detect a capacitance of the DOC; a particulate matter accumulation estimating unit that estimates an amount of particulate matter accumulated in the DPF on the basis of the detected capacitance; and a forced regeneration control unit that injects fuel into the DOC and performs forced regeneration that burns and removes at least the particulate matter accumulated in the DPF when the estimated accumulated particulate matter amount surpasses a predetermined amount.

10 Claims, 5 Drawing Sheets

(51) Int. Cl.
  *F01N 3/10* (2006.01)
  *F01N 9/00* (2006.01)
  *F01N 3/025* (2006.01)
  *F01N 13/00* (2010.01)

(52) U.S. Cl.
  CPC ......... *F01N 9/002* (2013.01); *F01N 13/0097* (2014.06); *F01N 13/011* (2014.06); *F01N 2410/00* (2013.01); *F01N 2560/12* (2013.01); *F01N 2900/0601* (2013.01); *F01N 2900/1602* (2013.01); *F01N 2900/1606* (2013.01); *F02D 2200/0812* (2013.01); *Y02T 10/47* (2013.01)

(58) Field of Classification Search
  USPC .......................................................... 60/295
  See application file for complete search history.

(56) References Cited

FOREIGN PATENT DOCUMENTS

| JP | 2009-97410 | 5/2009 |
| JP | 2010-144630 | 7/2010 |
| JP | 2011-247145 | 12/2011 |

OTHER PUBLICATIONS

Espacenet Bibliographic data, Publication No. 2008-8151, published Jan. 17, 2008.
Patent Abstracts of Japan, Publication No. 2009-97410, published May 7, 2009.
International Search Report dated Dec. 22, 2014, in corresponding International Application No. PCT/JP2014/076962.
International Preliminary Report on Patentability dated Apr. 12, 2016 in corresponding International Patent Application No. PCT/JP2014/076962.

* cited by examiner (A)

(B)

EXHAUST PURIFICATION SYSTEM

CROSS-REFERENCE TO RELATED APPLICATIONS

This application is a U.S. National Stage Application, which claims the benefit under 35 U.S.C. §371 of PCT International Patent Application No. PCT/JP2014/076962, filed Oct. 8, 2014, which claims the foreign priority benefit under 35 U.S.C. §119 of Japanese Patent Application No. 2013-210700, filed Oct. 8, 2013, the contents of which are incorporated herein by reference.

TECHNICAL FIELD

The present invention relates to an exhaust purification system, and in particular to an exhaust purification system that includes a filter for collecting particulate matter contained in exhaust gas emitted from an internal combustion engine.

BACKGROUND ART

A diesel particulate filter (hereinafter referred to as "DPF"), for example, is known as a filter for collecting particulate matter (hereinafter referred to as "PM") contained in exhaust gas emitted from a diesel engine.

The DPF can only collect a limited amount of PM. Thus, so-called forced regenerations need to be performed, in which accumulated PM is periodically burned and removed. In a forced regeneration, unburned hydrocarbons (HC) are supplied to a diesel oxidation catalyst (hereinafter referred to as "DOC") on an upstream side in an exhaust gas flowing direction through in-pipe injection (fuel injection into an exhaust pipe) or post-injection to cause oxidation, and to raise the temperature of the exhaust gas to a PM burning temperature.

Known techniques for detecting an amount of accumulated PM collected by a DPF include, for example, a technique of estimating the amount on the basis of a pressure difference across the DPF and a technique of estimating the amount from the electrostatic capacity (capacitance) between electrodes provided in the DPF (e.g., see PATENT LITERATURE DOCUMENTS 1 and 2).

LISTING OF REFERENCES

PATENT LITERATURE DOCUMENT 1: Japanese Patent Application Laid-Open Publication No. 2011-247145
PATENT LITERATURE DOCUMENT 2: Japanese Patent Application Laid-Open Publication No. 2009-97410

The technique of estimating the amount of accumulated PM on the basis of the pressure difference across the DPF, however, faces an issue that the amount of accumulated PM cannot be estimated accurately because the sensitivity drops particularly in an operation range in which the flow rate of the exhaust gas decreases. The technique of estimating the amount from the electrostatic capacity between the electrodes enables the amount of accumulated PM to be estimated without being affected by a running condition of a vehicle or the like. However, the dimensions or the arrangement of the electrodes needs to be decided individually in accordance with the shapes, the pitch, or the like of cells disposed in the DPF. This creates an issue that the technique cannot flexibly deal with the specifications or the like of the DPF.

SUMMARY OF THE INVENTION

The system disclosed herein has an object to detect an amount of accumulated PM in a DPF with high accuracy.

A system disclosed herein includes an oxidation catalyst provided in an exhaust passage of an internal combustion engine; a filter provided in the exhaust passage at a position downstream of the oxidation catalyst to collect particulate matter contained in exhaust gas; an electrostatic capacity detecting unit that detects an electrostatic capacity (capacitance) of the oxidation catalyst; an accumulation amount estimating unit that estimates an amount of accumulated particulate matter in the filter on the basis of the electrostatic capacity entered from the electrostatic capacity detecting unit; and a filter regenerating unit that executes a forced regeneration to burn and remove the particulate matter that has accumulated at least in the filter by injecting fuel to the oxidation catalyst when the amount of the accumulated particulate matter entered from the accumulation amount estimating unit exceeds a predetermined amount.

The system disclosed herein can detect an amount of PM accumulated in a DPF with high accuracy.

DETAILED DESCRIPTION

Figure 1:
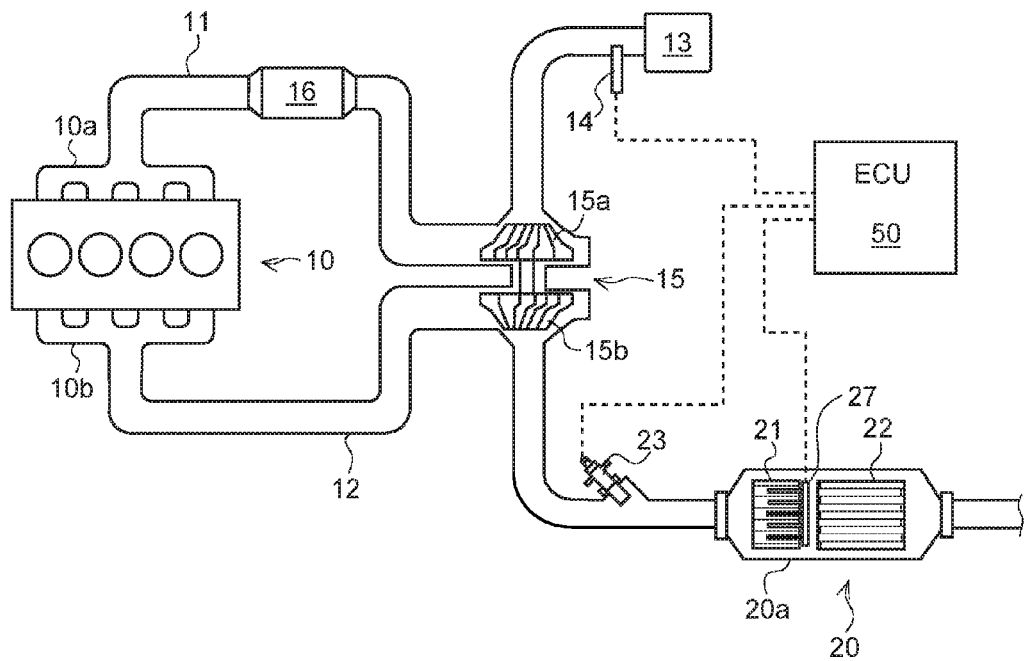
FIG. 1 is an overall configuration diagram schematically illustrating an exhaust purification system according to an embodiment of the present invention.

An exhaust purification system according to embodiments of the present invention will be described with reference to the appended drawings. Identical components are given identical reference numerals and symbols, and their names and functions are identical as well. Therefore, detailed descriptions of such components are not repeated.

As illustrated in FIG. 1, a diesel engine (hereinafter simply referred to "engine") 10 has an intake manifold 10a and an exhaust manifold 10b. An intake passage 11 for introducing fresh air is connected to the intake manifold 10a, and an exhaust passage 12 for discharging the exhaust gas to the atmosphere is connected to the exhaust manifold 10b.

On the intake passage 11, disposed are an air cleaner 13, a mass airflow sensor 14, a compressor 15a of a turbo charger 15, an intercooler 16, and so on in this order from the upstream side with respect to an intake air flowing direction. On the exhaust passage 12, disposed are a turbine 15b of the turbo charger 15, an exhaust gas aftertreatment device 20, and so on in this order from the upstream side with respect to an exhaust gas flowing direction.

The exhaust gas aftertreatment device 20 includes a catalyst casing 20a, a DOC 21, and a DPF 22. The DOC 21 is disposed upstream of the DPF 22 in the catalyst casing 20a. An in-pipe injection device (device for injecting fuel into the exhaust passage) 23 is provided upstream of the DOC 21.

The in-pipe injection device 23, which constitutes a part of a filter regenerating unit according to the present invention, injects unburned fuel (primarily HC) into the exhaust passage 12 in response to an instruction signal (pulse current) entered from an electronic control unit (hereinafter referred to as "ECU") 50. It should be noted that the in-pipe injection device 23 may be omitted if post-injection by means of multiple-injection of the engine 10 is employed.

The DOC 21 includes a ceramic carrier having, for example, a cordierite honeycomb structure and a catalyst component supported on a surface of the ceramic carrier. The DOC 21 has a number of cells, which are defined by porous partition walls, arranged along the exhaust gas flowing direction. The DOC 21 collects the PM contained in the exhaust gas into fine pores of the partition walls and the surfaces of the partition walls. As unburned fuel (HC) is supplied to the DOC 21 by the in-pipe injection device 23 or through post-injection, the DOC 21 oxidizes the HC to raise the exhaust gas temperature.

The DOC 21 of this embodiment has a plurality of electrodes 27 that are disposed so as to face each other with at least one or more partition walls interposed therebetween to form a capacitor. The outer peripheral faces of the electrodes 27 are covered with corrosion-resistive insulating layers (not shown). The electrodes 27 are electrically connected to the ECU 50 via an electrostatic capacity detecting circuit (not shown). The electrodes 27 and the electrostatic capacity detecting circuit (not shown) serve as a preferred example of an electrostatic capacity detecting unit according to the present invention.

The DPF 22 includes, for example, a number of cells, which are defined by porous partition walls, arranged along the exhaust gas flowing direction. The upstream sides and the downstream sides of these cells are plugged in an alternating manner. The DPF 22 collects the PM contained in the exhaust gas into the small cavities in the partition walls or onto their surfaces. When an estimated amount of accumulated PM reaches a predetermined amount, a so-called forced regeneration is carried out to the DPF 22, i.e., the accumulated PM in the DPF 22 is burned and removed. In the forced regeneration, unburned fuel (HC) is supplied to the DOC 21 by the in-pipe injection device 23 or through post-injection, and the temperature of the exhaust gas flowing into the DPF 22 is raised to a PM-burning temperature (e.g., approximately 500 degrees C. to 600 degrees C.).

The ECU 50 controls the engine 10, the in-pipe injection device 23, and other components. The ECU 50 includes a CPU, a ROM, a RAM, input ports, output ports, and other components which are known in the art.

Figure 2:
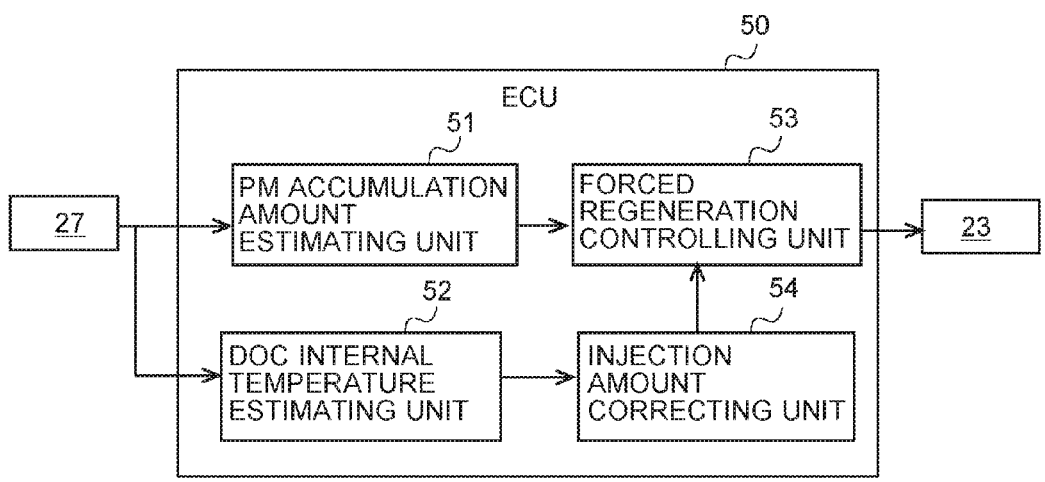
FIG. 2 is a functional block diagram of an ECU according to an embodiment of the present invention.

As illustrated in FIG. 2, the ECU 50 also includes, as some of its function elements, a PM accumulation amount estimating unit 51, a DOC internal temperature estimating unit 52, a forced regeneration controlling unit 53, and an injection amount correcting unit 54. The description continues with a premise that these functional elements are included in the ECU 50, which is an integrated piece of hardware. Alternatively, some of these functional elements may be provided in separate pieces of hardware.

The PM accumulation amount estimating unit 51, which is an example of an accumulation amount estimating unit according to the present invention, estimates an amount of accumulated PM, which is collected by the DPF 22, (hereinafter referred to as "DPF accumulation amount $PM_{DEP}$") on the basis of an electrostatic capacity (capacitance) C between the electrodes 27 provided in the DOC 21. In general, the electrostatic capacity C between the electrodes 27 is expressed by Expression 1, where $\in$ represents the dielectric constant of a medium between the electrodes 27, S represents the area of the electrodes 27, and d represents the distance between the electrodes 27.

$$C = \varepsilon \times \frac{S}{d} \quad \text{[Expression 1]}$$

In Expression 1, the area S of the electrodes 27 and the distance d therebetween are the constants. As more PM accumulates between the electrodes 27, the dielectric constant $\in$ and the distance d change, and so does the electrostatic capacity C. In other words, detecting the electrostatic capacity C between the electrodes 27 enables the amount of accumulated PM collected by the DOC 21 (hereinafter referred to as "DOC accumulation amount $PM_{DOC}$") to be calculated.

Figure 3:
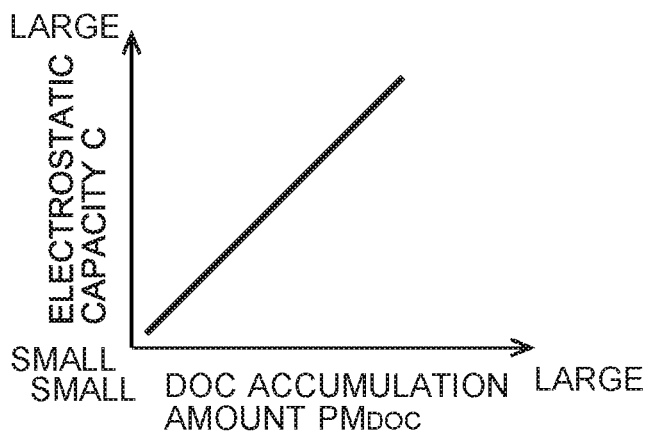
FIG. 3(A) illustrates an example of a DOC accumulation amount map according to an embodiment of the present invention.
FIG. 3(B) illustrates an example of a map of correlation between the DOC accumulation amount and a DPF accumulation amount according to an embodiment of the present invention.
Figure 3:
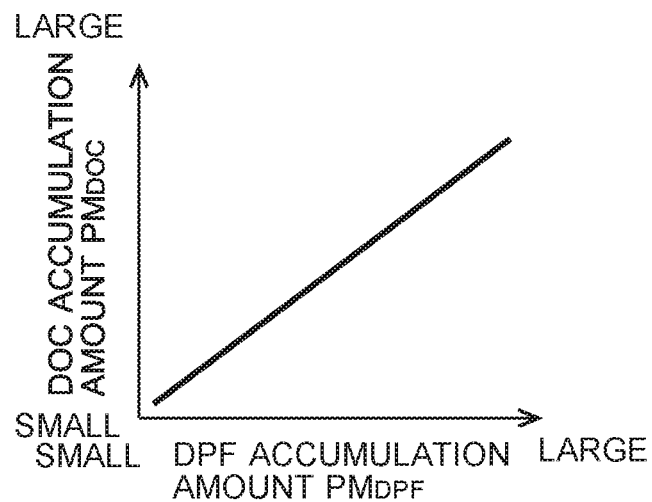

The ECU 50 stores a DOC accumulation amount map (e.g., see FIG. 3(A)) indicating the relation between the electrostatic capacity C between the electrodes 27 and the DOC accumulation amount $PM_{DOC}$, and also stores a correlation map of DOC-DPF accumulation amount (e.g., see FIG. 3(B)) indicating the relation between the DOC accumulation amount $PM_{DOC}$ and the DPF accumulation amount $PM_{DPF}$. These maps are prepared in advance through experiments or the like. The PM accumulation amount estimating unit 51 is configured to estimate the DOC accumulation amount $PM_{DOC}$ by reading out, from the DOC accumulation amount map, a value corresponding to the electrostatic capacity C between the electrodes 27, and to estimate the DPF accumulation amount $PM_{DPF}$ by reading out, from the DOC-DPF accumulation amount correlation map, a value corresponding to the DOC accumulation amount $PM_{DOC}$. It should be noted that the DOC accumulation amount $PM_{DOC}$ and the DPF accumulation amount $PM_{DPF}$ may be estimated from other than these maps. For example, the DOC accumulation amount $PM_{DOC}$ and the DPF accumulation amount $PM_{DPF}$ may be estimated through an approximation formula or the like, which may be prepared in advance through experiments or the like.

The DOC internal temperature estimating unit 52, which is an example of an internal temperature estimating unit according to the present invention, calculates the internal temperature of the DOC 21 (hereinafter referred to as "DOC internal temperature $T_{DOC}$") on the basis of the electrostatic capacity C between the electrodes 27. In Expression 1, when the dielectric constant $\in$ changes as being affected by the exhaust gas temperature, the electrostatic capacity C also changes correspondingly. In other words, detecting the electrostatic capacity C between the electrodes 27 enables the DOC internal temperature $T_{DOC}$ to be calculated.

The ECU 50 stores a temperature characteristics map (e.g., see FIG. 4) indicating the relation between the electrostatic capacity C and the DOC internal temperature $T_{DOC}$. The map is prepared in advance by experiments or the like. The DOC internal temperature estimating unit 52 is configured to estimate the DOC internal temperature $T_{DOC}$ by reading out, from the temperature characteristics map, a value corresponding to the electrostatic capacity C between the electrodes 27. It should be noted that the DOC internal temperature $T_{DOC}$ may be estimated from other than the map. For example, the DOC internal temperature $T_{DOC}$ may be estimated through an approximation formula or the like, which may be prepared in advance through experiments or the like.

The forced regeneration controlling unit 53, which is an example of a filter regenerating unit according to the present invention, controls a forced regeneration on the basis of the DPF accumulation amount $PM_{DPF}$ entered from the PM accumulation amount estimating unit 51. Specifically, the forced regeneration controlling unit 53 starts the forced regeneration by causing the in-pipe injection device 23 to execute in-pipe injection in a predetermined amount when the DPF accumulation amount $PM_{DPF}$ exceeds an upper limit accumulation amount $PM_{MAX}$ up to which the DPF 22 can collect PM ($PM_{DEP} > PM_{MAX}$). The amount of in-pipe injection in the forced regeneration is corrected as necessary by the injection amount correcting unit 54, which will be described below.

Figure 5:
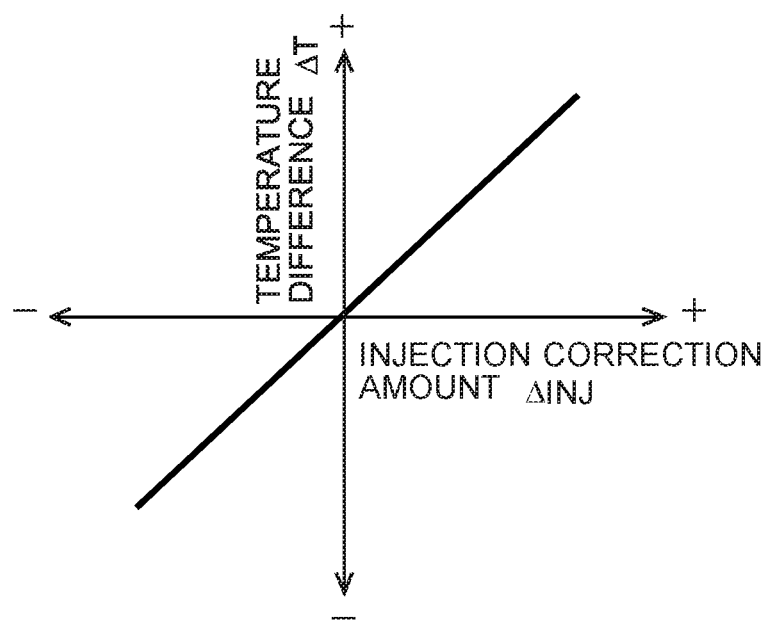
FIG. 5 illustrates an example of an injection amount correction map according to an embodiment of the present invention.

The injection amount correcting unit 54 corrects the fuel injection amount in a forced regeneration on the basis of a temperature difference ΔT between the DOC internal temperature $T_{DOC}$, which is entered from the DOC internal temperature estimating unit 52, and a target temperature $T_{TARGT}$ at which the PM in the DPF 22 is substantially completely burned and removed. Specifically, the ECU 50 stores an injection amount correction map (e.g., see FIG. 5) indicating the relation between the temperature difference ΔT and an injection correction amount ΔINJ needed to compensate for the temperature difference ΔT. The injection amount correction map is prepared in advance by experiments or the like. The in-pipe injection amount $INJ_{Q\ exh}$ in a forced regeneration is set by reading out, from the injection amount correction map, an injection correction amount ΔINJ corresponding to the temperature difference ΔT and by adding the read-out injection correction amount ΔINJ or subtracting the read-out injection correction amount ΔINJ to or from a standard injection amount $INJ_{Q\ std}$ ($INJ_{Q\ exh} = INJ_{Q\ std} +/- \Delta INJ$). The fuel injection after the correction is executed by increasing or reducing the conducting pulse duration of each injection applied to an injector of the in-pipe injection device 23 or by increasing or reducing the frequency of injections.

Figure 6:
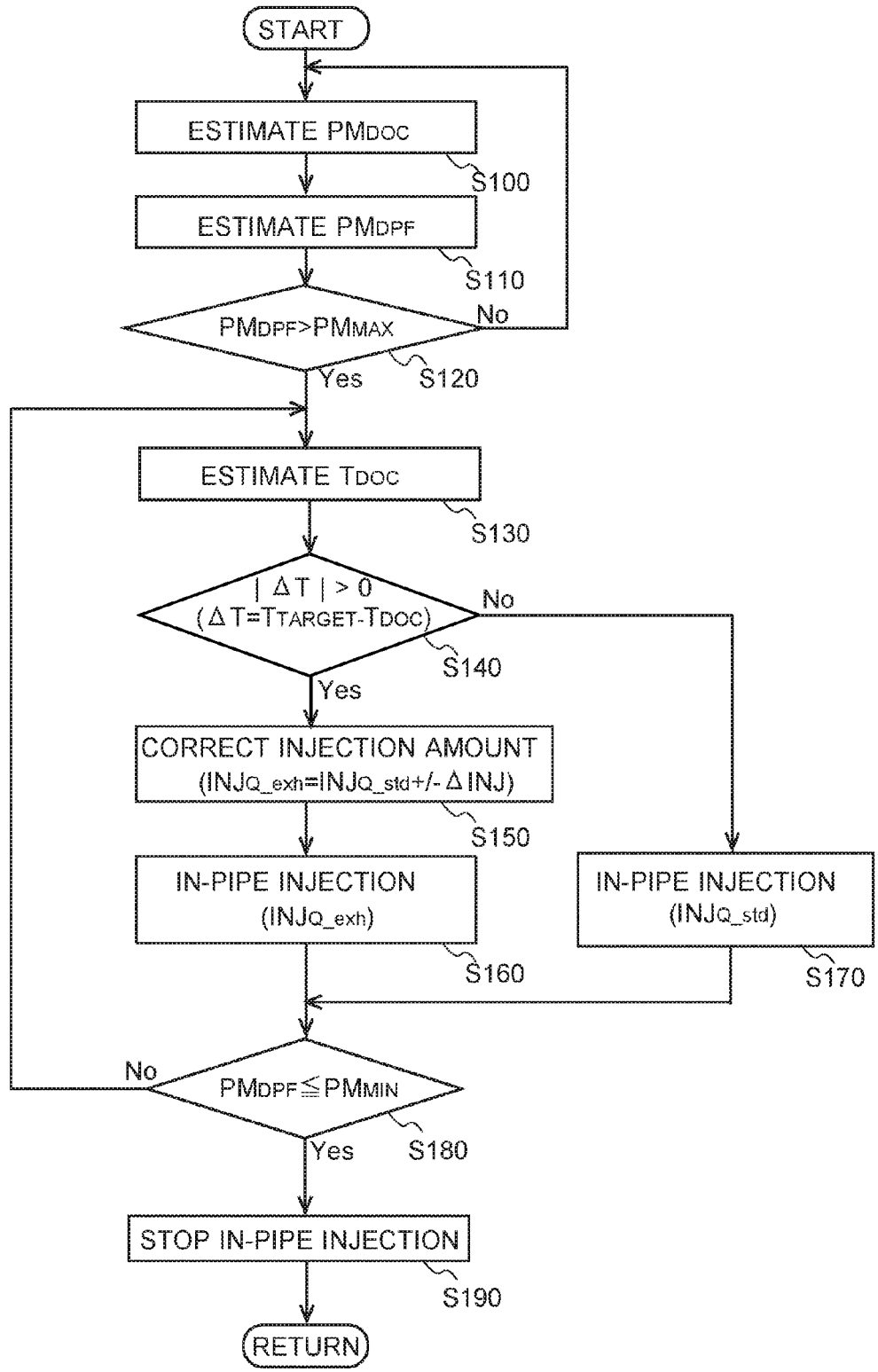
FIG. 6 is a flowchart illustrating contents of control according to an embodiment of the present invention.

Referring now to FIG. 6, a control process of the exhaust purification system of this embodiment will be described. This control starts when an ignition key is turned on.

In Step 100 (hereinafter, the term "step" is abbreviated as "S"), the DOC accumulation amount $PM_{DOC}$ corresponding to the electrostatic capacity C between the electrodes 27 is read out from the DOC accumulation amount map (see FIG. 3(A)). In S110, the DPF accumulation amount $PM_{DPF}$ corresponding to the DOC accumulation amount $PM_{DOC}$ in S100 is read out from the DOC-DPF accumulation amount correlation map (see FIG. 3(B)).

In S120, it is determined whether the DPF accumulation amount $PM_{DPF}$ has exceeded the upper limit accumulation amount $PM_{MAX}$. If the DPF accumulation amount $PM_{DPF}$ has exceeded the upper limit accumulation amount $PM_{MAX}$ (Yes), the processing proceeds to S130 to start a forced regeneration to the DPF 22.

Figure 4:
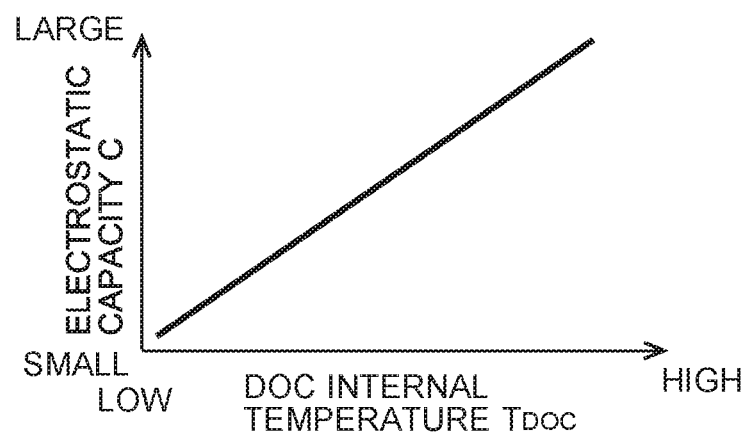
FIG. 4 illustrates an example of a temperature characteristics map according to an embodiment of the present invention.

In S130, the DOC internal temperature $T_{DOC}$ corresponding to the electrostatic capacity C between the electrodes 27 is read out from the temperature characteristics map (see FIG. 4). In S140, the DOC internal temperature $T_{DOC}$ is compared to the target temperature $T_{TARGT}$. If the temperature difference ΔT (absolute value) between the target temperature $T_{TARGT}$ and the DPF internal temperature $T_{DPF}$ is greater than 0 (Yes), the processing proceeds to S150. On the other hand, if the temperature difference ΔT is 0 (No), the DOC internal temperature $T_{DOC}$ can be raised to the target temperature $T_{TARGT}$ even if the in-pipe injection is executed in the standard injection amount $INJ_{Q\ std}$. In this case, the processing proceeds to S170, and the in-pipe injection is executed in the standard injection amount $INJ_{Q\ std}$.

In S150, the injection amount is corrected by adding the injection correction amount ΔINJ, which is read out from the injection amount correction map in accordance with the temperature difference ΔT, or subtracting the injection correction amount ΔINJ to or from the standard injection amount $INJ_{Q\ std}$ ($INJ_{Q\ exh} = INJ_{Q\ std} +/- \Delta INJ$). In S160, the in-pipe injection is executed on the basis of the corrected in-pipe injection amount $INJ_{Q\ exh}$.

In S180, it is determined whether the DPF accumulation amount $PM_{DPF}$ has decreased to a lower threshold $PM_{MIN}$. The lower threshold $PM_{MIN}$ indicates the end of the regeneration of the DPF 22. If the DPF accumulation amount $PM_{DPF}$ has decreased to the lower threshold $PM_{MIN}$ (Yes), the in-pipe injection is stopped in S190, and this control proceeds to "Return." Thereafter, S100 to S190 are iterated until the ignition key is turned off.

Effects of the exhaust purification system of this embodiment will now be described.

Conventionally, the technique of estimating an amount of accumulated PM with a differential pressure sensor encounters a problem that the sensitivity drops particularly in a low load operation range in which the flow rate of the exhaust gas decreases or toward the end of a forced regeneration. In contrast, the exhaust purification system of this embodiment estimates the DPF accumulation amount $PM_{DPF}$ in the DPF 22 on the basis of the electrostatic capacity C between the electrodes 27 provided in the DOC 21. In other words, an amount of accumulated PM in the DPF 22 is estimated with high accuracy on the basis of the electrostatic capacity C between the electrodes 27 that has good sensitivity even in the low load operation range or toward the end of a forced regeneration.

Accordingly, the exhaust purification system of this embodiment enables the amount of accumulated PM to be estimated with high accuracy without being affected by the running condition of a vehicle or the like. Since the electrodes 27 are provided in the DOC 21, the dimensions or the arrangement of the electrodes 27 need not be set individually in accordance with the shapes, the pitch, or the like of the cells in the DPF 22. Thus, it is possible to flexibly cope with the specifications of the like of the DPF 22.

Figure 7:
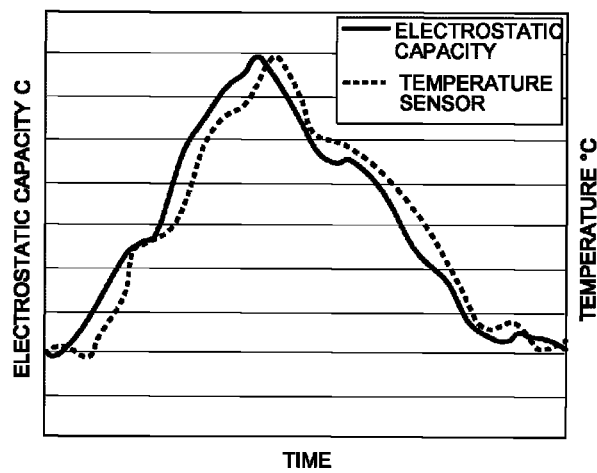
FIG. 7 illustrates a graph comparing the electrostatic capacity between electrodes to a sensor value of an exhaust gas temperature sensor.

Typically, the electrostatic capacity C between the electrodes 27 has characteristics of responding more quickly to a change in the exhaust gas temperature than the sensor value of the exhaust gas temperature sensor does, as illustrated in FIG. 7. In other words, the use of the electrostatic capacity C between the electrodes 27 disposed in the DOC 21 makes it possible to detect the internal temperature accurately, as compared with the use of the sensor value of the exhaust temperature sensor(s) provided across the DOC 21.

In the exhaust purification system of this embodiment, the in-pipe injection amount (or the post-injection amount) in a forced regeneration is corrected (adjusted) on the basis of the temperature difference $\Delta T$ between the target temperature $T_{TARGT}$ and the DOC internal temperature $T_{DOC}$, which is calculated from the electrostatic capacity C between the electrodes 27. In other words, as compared to the conventional technique of correcting the injection amount with the use of the sensor value of the exhaust gas temperature sensor, the in-pipe injection amount in the forced regeneration can be optimized by this embodiment because the DOC internal temperature $T_{DOC}$ is accurately detected.

Accordingly, the exhaust purification system of this embodiment enables the fuel injection amount in the forced regeneration to be controlled with accuracy and can thus effectively improve the regeneration efficiency of the DPF 22. In addition, an exhaust gas temperature sensor(s) do(es) not need to be provided across the DOC 21. Therefore, the cost and the size of the overall apparatus can be effectively reduced.

It should be noted that the present invention is not limited to the above-described embodiment, and can be implemented with modifications, as appropriate, within the scope that does not depart from the spirit of the present invention.

For example, it suffices that the number of pairs of the electrodes 27 is at least one, and the illustrated embodiment is not limiting in this regard. The engine 10 is not limited to a diesel engine, and an embodiment can be applied widely to other internal combustion engines including a gasoline engine.

Figure 8:
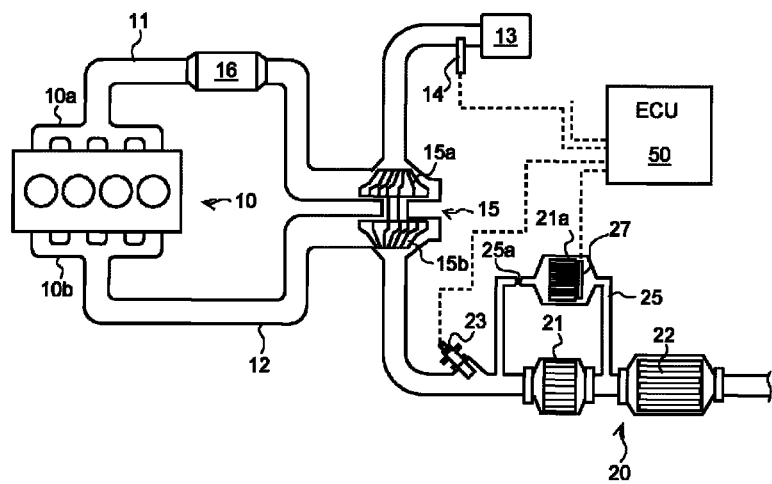
FIG. 8 is an overall configuration diagram schematically illustrating an exhaust purification system of an internal combustion engine according to another embodiment of the present invention.

As illustrated in FIG. 8, a bypass passage 25 may be connected to the exhaust passage 12 so as to bypass the DOC 21, and the DOC 21a for measurement may be disposed in the bypass passage 25. The DOC 21a has a small capacity. In this configuration, electrodes 27 are preferably provided in the DOC 21a, and an orifice 25a (restriction) for regulating the flow rate of the exhaust gas is preferably provided in the bypass passage 25. When a forced regeneration of the DOC 21a is executed, a voltage may be applied to the electrodes 27 to cause the electrodes 27 to function as a heater.

The invention claimed is:

1. An exhaust purification system comprising:
   an oxidation catalyst provided in an exhaust passage of an internal combustion engine;
   a filter provided in the exhaust passage at a position downstream of the oxidation catalyst to collect particulate matter contained in exhaust gas;
   a plurality of electrodes to detect an electrostatic capacity of the oxidation catalyst;
   an injector to inject an amount of fuel into the oxidation catalyst; and
   an electronic controller configured to
   estimate an amount of accumulated particulate matter in the filter based on the detected electrostatic capacity,
   execute a forced regeneration to burn and remove the particulate matter that has accumulated at least in the filter by injecting the fuel into the oxidation catalyst, when the amount of accumulated particulate matter exceeds a predetermined amount,
   estimate an internal temperature of the oxidation catalyst based on the detected electrostatic capacity, and
   correct the amount of fuel based on a temperature difference between a filter target temperature for the forced regeneration and the internal temperature.

2. The exhaust purification system according to claim 1, wherein the plurality of electrodes is disposed in the oxidation catalyst so as to face each other with at least one partition wall interposed therebetween to form a capacitor.

3. The exhaust purification system according to claim 1, further comprising:
   a bypass passage that branches off from the exhaust passage at a position upstream of the oxidation catalyst and connects to the exhaust passage at a position downstream of the oxidation catalyst so as to bypass the oxidation catalyst; and
   a second oxidation catalyst disposed in the bypass passage,
   wherein the plurality of electrodes is disposed in the second oxidation catalyst such that the plurality of electrodes face each other over at least one partition wall in the second oxidation catalyst.

4. The exhaust purification system according to claim 1, wherein the plurality of electrodes is disposed between the oxidation catalyst and the filter.

5. An exhaust purification system comprising:
   an oxidation catalyst provided in an exhaust passage of an internal combustion engine and to which an amount of fuel is provided;
   a filter provided in the exhaust passage at a position downstream of the oxidation catalyst to collect particulate matter contained in exhaust gas;
   electrodes to detect an electrostatic capacity of the oxidation catalyst; and
   an electronic controller configured to
   estimate an amount of accumulated particulate matter in the filter based on the detected electrostatic capacity,
   execute a forced regeneration to burn the particulate matter by providing the amount of fuel when the estimated amount of accumulated particulate matter exceeds a predetermined amount,
   estimate an internal temperature of the oxidation catalyst based on the detected electrostatic capacity, and
   correct the amount of fuel provided to the oxidation catalyst based on a temperature difference between a filter target temperature for the forced regeneration and the estimated internal temperature.

6. The exhaust purification system according to claim 5, wherein the electrodes are disposed in the oxidation catalyst so as to face each other with at least one partition wall interposed therebetween to form a capacitor.

7. The exhaust purification system according to claim 5, further comprising:
   a bypass passage that branches off from the exhaust passage at a position upstream of the oxidation catalyst and connects to the exhaust passage at a position downstream of the oxidation catalyst so as to bypass the oxidation catalyst; and
   a second oxidation catalyst disposed in the bypass passage,
   wherein the electrodes are disposed in the second oxidation catalyst.

8. The exhaust purification system according to claim 5, wherein the filter is a diesel particulate filter.

9. The exhaust purification system according to claim 5, wherein the electrodes are disposed between the oxidation catalyst and the filter.

10. The exhaust purification system according to claim 5, wherein the internal combustion engine is a diesel engine.

* * * * *